(12) United States Patent
Kitaguchi et al.

(10) Patent No.: US 10,662,118 B2
(45) Date of Patent: May 26, 2020

(54) MANUFACTURING METHOD OF HONEYCOMB STRUCTURE, AND HONEYCOMB STRUCTURE

(71) Applicant: NGK INSULATORS, LTD., Nagoya (JP)

(72) Inventors: Daniel Yukichi Kitaguchi, Nagoya (JP); Nobuyuki Kashiwagi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 122 days.

(21) Appl. No.: 15/875,224

(22) Filed: Jan. 19, 2018

(65) Prior Publication Data

US 2018/0215672 A1    Aug. 2, 2018

(30) Foreign Application Priority Data

Jan. 31, 2017    (JP) ................... 2017-016351

(51) Int. Cl.
| | |
|---|---|
| *C04B 38/00* | (2006.01) |
| *C04B 41/85* | (2006.01) |
| *B01D 46/24* | (2006.01) |
| *B01D 46/00* | (2006.01) |
| *B01J 29/88* | (2006.01) |

(Continued)

(52) U.S. Cl.
CPC ...... *C04B 38/0009* (2013.01); *B01D 46/0001* (2013.01); *B01D 46/247* (2013.01); *B01D 46/2429* (2013.01); *B01D 46/2462* (2013.01); *B01J 29/88* (2013.01); *B01J 35/04* (2013.01); *B01J 37/0009* (2013.01); *B01J 37/0215* (2013.01); *B01J 37/08* (2013.01); *C04B 41/009* (2013.01); *C04B 41/5024* (2013.01); *C04B 41/85* (2013.01); *C04B 41/87* (2013.01); *B01D 46/2474* (2013.01); *B01D 2046/2433* (2013.01); *B01D 2046/2481* (2013.01); *B01D 2046/2485* (2013.01); *C04B 2111/0081* (2013.01); *C04B 2111/00793* (2013.01)

(58) Field of Classification Search
CPC .................. C04B 38/0009; B01D 46/0001
USPC ................................. 427/376.1
See application file for complete search history.

(56) References Cited

U.S. PATENT DOCUMENTS

2014/0294691 A1 * 10/2014 Kikuchi ............ B01D 46/2418
                                                              422/180

FOREIGN PATENT DOCUMENTS

| JP | 2004-074564 A1 | 3/2004 |
|---|---|---|
| JP | 2004074564 A * | 3/2004 |

(Continued)

*Primary Examiner* — Tabatha L Penny
(74) *Attorney, Agent, or Firm* — Burr & Brown, PLLC

(57) ABSTRACT

A manufacturing method of a honeycomb structure includes a forming step of forming a honeycomb formed body by use of a kneaded material containing a cordierite forming raw material, a slurry coating step of coating a coating layer forming slurry which contains a cordierite forming raw material on four regions in a rotation area when each of two straight lines passing through the center of gravity of the cross section and extending in a diagonal direction of main quadrangular cells is rotated in a range of ±x° of the center of gravity in a circumferential surface, and a firing step of firing the honeycomb formed body on which the slurry is coated. The value x is in a range of 7 to 45, and the slurry is adjusted so that the coating layer has a porosity higher than that of the honeycomb structure body as much as 5% or more.

7 Claims, 7 Drawing Sheets

(51) Int. Cl.
  *B01J 35/04*   (2006.01)
  *B01J 37/00*   (2006.01)
  *B01J 37/02*   (2006.01)
  *B01J 37/08*   (2006.01)
  *C04B 41/00*   (2006.01)
  *C04B 41/50*   (2006.01)
  *C04B 41/87*   (2006.01)
  *C04B 111/00*  (2006.01)

(56) References Cited

FOREIGN PATENT DOCUMENTS

WO   2009/035049 A1   3/2009
WO   WO-2009035049 A1 *   3/2009   ........... C04B 35/185

* cited by examiner

"The present application is an application based on JP-2017-016351 filed on Jan. 31, 2017 with Japan Patent Office, the entire contents of which are incorporated herein by reference."

MANUFACTURING METHOD OF HONEYCOMB STRUCTURE, AND HONEYCOMB STRUCTURE

BACKGROUND OF THE INVENTION

Field of the Invention

The present invention relates to a honeycomb structure for use in a catalyst carrier for an exhaust gas purifying catalyst converter, a particulate trapping filter such as a diesel particulate filter or a gasoline particulate filter, or the like, and a manufacturing method of the honeycomb structure.

Description of the Related Art

Honeycomb structures are broadly used in a catalyst carrier for an exhaust gas purifying catalyst converter of an internal combustion engine such as a car engine, particulate trapping filters such as a diesel particulate filter (DPF) and a gasoline particulate filter (GPF), and the like.

In the case of manufacturing such a honeycomb structure, a kneaded material including a predetermined ceramic raw material is initially formed into a honeycomb foamed body having partition walls defining a plurality of cells extending from one end face to the other end face and a circumferential wall surrounding the partition walls, by extrusion or the like. Next, the honeycomb formed body obtained in this manner is dried and then fired, thereby obtaining the honeycomb structure which is made porous.

Incidentally, in the manufacturing of the honeycomb structure in which a shape of the cells is quadrangular, there has been the problem that cracks are easily generated in a region of the circumferential wall which is crossed by a straight line passing through the center of gravity of a cross section of the honeycomb formed body and extending in a diagonal direction of the quadrangular shape of the cells, during firing of the honeycomb formed body. Particularly, in manufacturing of a large honeycomb structure, such generation of the cracks is remarkable, and hence countermeasures are required.

Heretofore, as the countermeasures to prevent the above-mentioned generation of the cracks, there have been employed a method of adjusting (prolonging) a heat curve during the firing, and a method of decreasing the number of the honeycomb formed bodies to be packed in a kiln (a firing furnace). Furthermore, there have also been performed a method of limiting an amount of an additive (an organic binder or the like) to be added to a raw material, for the purpose of improving formability, and a method of adding an inorganic binder to the raw material.

Additionally, there has been suggested a method of grinding a predetermined region of a circumferential wall or forming a slit prior to firing a honeycomb formed body, thereby relieving stress applied to the predetermined region of the circumferential wall during the firing of the honeycomb formed body, to prevent cracks from being easily generated (see Patent Documents 1 and 2).

[Patent Document 1] WO 2009/035049
[Patent Document 2] JP-A-2004-74564

SUMMARY OF THE INVENTION

However, even in a method of adjusting (prolonging) a heat curve during firing, it is difficult to sufficiently inhibit generation of cracks. Furthermore, in the method of adjusting (prolonging) the heat curve during the firing or a method of decreasing the number of honeycomb formed bodies to be packed in a kiln (a firing furnace), there has been the problem that productivity deteriorates. Additionally, in a method of limiting an amount of an additive to be added to a raw material, there has been the problem that formability is adversely affected. In addition, in a method of adding an inorganic binder to a raw material, there has been the problem that production cost rises and that characteristics of a honeycomb structure deteriorate.

Furthermore, a method suggested in Patent Document 1 includes firing a honeycomb formed body, once grinding and removing a circumferential wall from the honeycomb formed body, and then forming a new circumferential wall on the honeycomb formed body by use of a coating material. According to the method, it takes time and labor to manufacture a honeycomb structure, and hence there is the tendency that productivity deteriorates. Additionally, a method suggested in Patent Document 2 also includes firing a honeycomb formed body, providing a slit in the honeycomb formed body by use of a burying agent, and then firing the honeycomb formed body again. Thus, it also takes time and labor to manufacture a honeycomb structure, and hence there is the tendency that the productivity deteriorates.

The present invention has been developed in view of conventional circumstances. Specifically, objects of the present invention are to provide a manufacturing method of a honeycomb structure which is capable of preventing cracks from being generated in a circumferential wall during firing of a honeycomb formed body, without causing adverse affection to formability, deterioration of characteristics, rise of production cost, or deterioration of productivity, and to provide the honeycomb structure obtainable by the manufacturing method.

To achieve the above objects, according to the present invention, there are provided a manufacturing method of a honeycomb structure, and the honeycomb structure as follows.

According to a first aspect of the present invention, a manufacturing method of a honeycomb structure is provided, including a forming step of monolithically forming a honeycomb formed body having partition walls defining a plurality of cells extending from one end face to the other end face, and a circumferential wall surrounding the partition walls, by use of a kneaded material containing a cordierite forming raw material, so that the plurality of cells are arranged in two mutually orthogonal directions in a cross section perpendicular to an extending direction of the cells, at least parts of the plurality of cells are quadrangular cells possessing a quadrangular shape in the cross section perpendicular to the extending direction of the cells, and at least 20% of the quadrangular cells are main quadrangular cells arranged in an orientation where diagonal lines of the cells extend in the same direction; a slurry coating step of drying the honeycomb formed body formed in the forming step, and coating a coating layer forming slurry which contains a cordierite forming raw material on four regions which are present in a rotation area when each of two straight lines passing through the center of gravity of the cross section and extending in a diagonal direction of the main quadrangular cells is rotated in a range of ±x° of the center of gravity that is a rotation center, in the cross section perpendicular to the extending direction of the cells in a circumferential surface that is an outer surface of the circumferential wall of the honeycomb formed body; and a firing step of firing the honeycomb formed body on which the coating layer forming slurry is coated in the slurry coating step, thereby manufacturing the honeycomb structure having a honeycomb structure main body deriving from the honeycomb formed body, and a coating layer deriving from the coating layer forming slurry, wherein the value x is a value in a range of 7 to 45, and the coating layer forming slurry for use in the slurry coating step is adjusted so that the coating layer formed by the slurry through the firing in the firing step has a porosity which is higher than a porosity of the honeycomb structure main body as much as 5% or more.

According to a second aspect of the present invention, the manufacturing method of the honeycomb structure according to the above first aspect is provided, wherein a thickness of the coating layer forming slurry to be coated in the slurry coating step is adjusted so that a thickness of the coating layer formed by the slurry through the firing in the firing step is from 0.1 to 3.0 mm.

According to a third aspect of the present invention, the manufacturing method of the honeycomb structure according to the above first or second aspects is provided, wherein the value x is a value in a range of 10 to 45.

According to a fourth aspect of the present invention, the manufacturing method of the honeycomb structure according to any one of the above first to third aspects is provided, wherein the coating layer forming slurry for use in the slurry coating step is adjusted so that the coating layer formed by the slurry through the firing in the firing step has a porosity which is higher than a porosity of the honeycomb structure main body as much as 5 to 50%.

According to a fifth aspect of the present invention, the manufacturing method of the honeycomb structure according to any one of the above first to fourth aspects is provided, wherein a thickness of the circumferential wall of the honeycomb formed body fired in the firing step is from 0.1 to 4.0 mm.

According to a sixth aspect of the present invention, the manufacturing method of the honeycomb structure according to any one of the above first to fifth aspects is provided, wherein all of the plurality of cells are quadrangular cells possessing a quadrangular shape in the cross section perpendicular to the extending direction of the cells.

According to a seventh aspect of the present invention, the manufacturing method of the honeycomb structure according to any one of the above first to fifth aspects is provided, wherein the plurality of cells include quadrangular cells possessing a quadrangular shape and octagonal cells possessing an octagonal shape and the quadrangular cells and the octagonal cells are alternately arranged in the cross section perpendicular to the extending direction of the cells.

According to an eighth aspect of the present invention, the honeycomb structure is provided including a honeycomb structure main body which has partition walls defining a plurality of cells extending from one end face to the other end face, and a circumferential wall surrounding the partition walls, and in which in a cross section perpendicular to an extending direction of the cells, the plurality of cells are arranged in two mutually orthogonal directions, at least parts of the plurality of cells are quadrangular cells possessing a quadrangular shape in the cross section perpendicular to the extending direction of the cells, and at least 20% of the quadrangular cells are main quadrangular cells arranged in an orientation where diagonal lines of the cells extend in the same direction; and a coating layer formed on four regions which are present in a rotation area when each of two straight lines passing through the center of gravity of the cross section and extending in a diagonal direction of the main quadrangular cells is rotated in a range of ±x° of the center of gravity that is a rotation center, in the cross section perpendicular to the extending direction of the cells in a circumferential surface that is an outer surface of the circumferential wall, wherein the value x is a value in a range of 7 to 45, and a porosity of the coating layer is higher than a porosity of the honeycomb structure main body as much as 5% or more, and the honeycomb structure main body and the coating layer are made of cordierite.

According to a ninth aspect of the present invention, the honeycomb structure according to the above eighth aspect is provided, wherein a thickness of the coating layer is from 0.1 to 3.0 mm.

According to a tenth aspect of the present invention, the honeycomb structure according to the above eighth or ninth aspects is provided, wherein the value x is a value in a range of 10 to 45.

According to the eleventh aspect of the present invention, the honeycomb structure according to any one of the above eighth to tenth aspects is provided, wherein the porosity of the coating layer is higher than the porosity of the honeycomb structure main body as much as 5 to 50%.

According to a twelfth aspect of the present invention, the honeycomb structure according to any one of the above eighth to eleventh aspects is provided, wherein a thickness of the circumferential wall is from 0.1 to 4.0 mm.

According to a thirteenth aspect of the present invention, the honeycomb structure according to any one of the above eighth to twelfth aspects is provided, wherein all of the plurality of cells are quadrangular cells possessing a quadrangular shape in the cross section perpendicular to the extending direction of the cells.

According to a fourteenth aspect of the present invention, the honeycomb structure according to any one of the above eighth to twelfth aspects is provided, wherein the plurality of cells include quadrangular cells possessing a quadrangular shape and octagonal cells possessing an octagonal shape and the quadrangular cells and the octagonal cells are alternately arranged in the cross section perpendicular to the extending direction of the cells.

In a manufacturing method of a honeycomb structure of the present invention, a slurry which contains a cordierite forming raw material in the same manner as in the honeycomb formed body and has a porosity after firing which is higher than a porosity of a honeycomb structure main body as much as 5% or more is coated on specific regions of a circumferential surface of a honeycomb formed body. Consequently, there are strengthened the specific regions of a circumferential wall of the honeycomb formed body in which cracks are easily generated during the firing, and it is possible to manufacture the honeycomb structure without generating any cracks in the regions. Furthermore, it is not necessary to limit an amount of an additive (an organic binder or the like) to be added to a raw material for the purpose of improving formability, and hence the formability is not adversely affected. Additionally, it is not necessary to add an inorganic binder to the raw material, and hence characteristics of the honeycomb structure are not deteriorated or production cost is not raised by the inorganic binder. In addition, even when a heat curve during the firing is not adjusted (prolonged) or the number of the honeycomb formed bodies to be packed in a kiln (a firing furnace) is not decreased, it is possible to prevent the generation of the cracks in the circumferential wall during the firing of the honeycomb formed body. Furthermore, the circumferential wall formed monolithically with the partition walls during forming of the honeycomb formed body is not removed by grinding or the like or is not formed with a slit in a manufacturing process of the honeycomb structure, but becomes the circumferential wall of a final product as it is, and hence it is possible to manufacture the honeycomb structure in a smaller number of steps. Consequently, according to the manufacturing method of the honeycomb structure of the present invention, a high productivity is obtainable in the manufacturing of the honeycomb structure in which any cracks are not generated in the circumferential wall.

Furthermore, a honeycomb structure of the present invention can be manufactured by the manufacturing method of the honeycomb structure of the present invention. Therefore, in the honeycomb structure of the present invention, the cracks are not easily generated in the circumferential wall in its manufacturing steps, the productivity is high, and it is possible to manufacture the honeycomb structure at low production cost.

DESCRIPTION OF THE PREFERRED EMBODIMENTS

Figure 1:
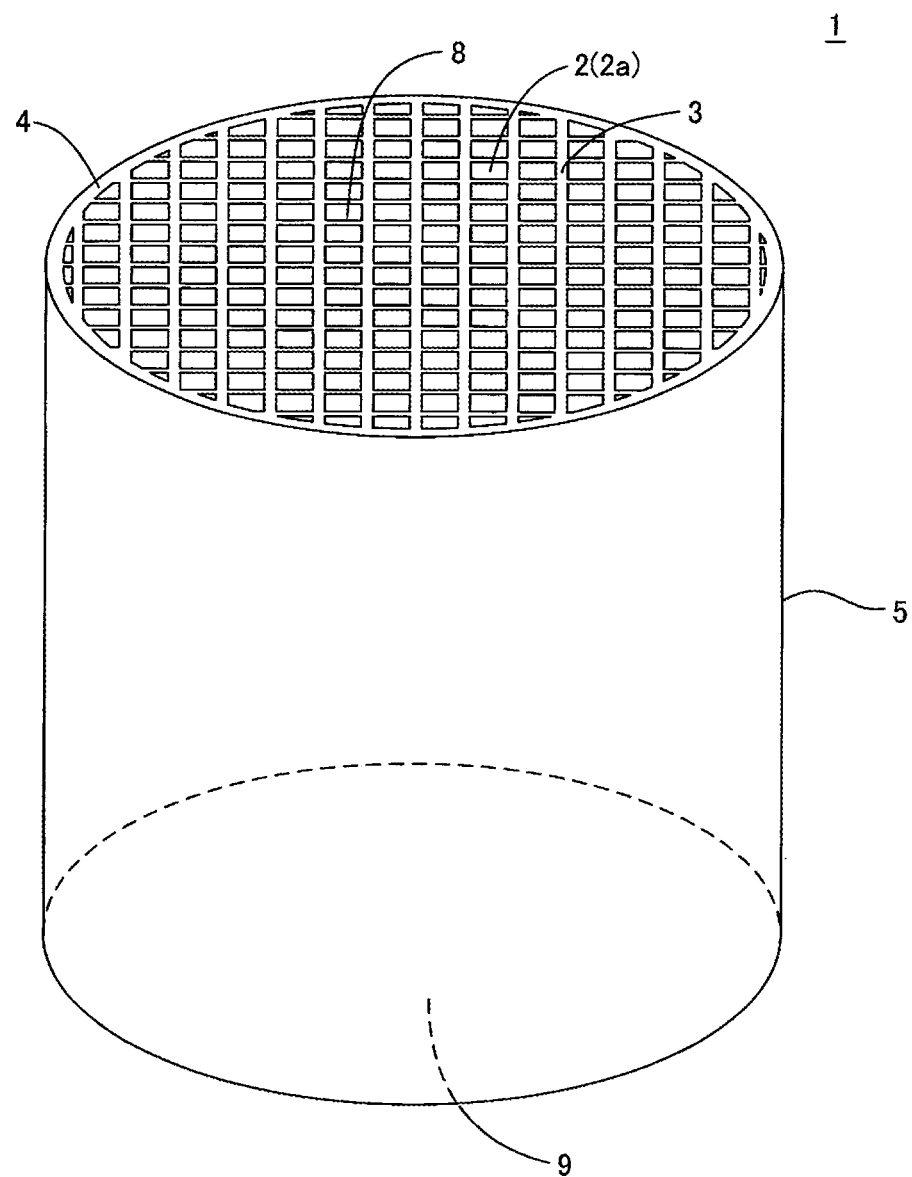
FIG. 1 is a perspective view schematically showing one example of a honeycomb formed body formed in a forming step.

Hereinafter, description will be made as to specific embodiments of the present invention, but the present invention is not restricted to the embodiments when interpreted, and various design changes, improvements and the like are addable on the basis of ordinary knowledge of a person skilled in the art without departing from the gist of the present invention.

(1) Manufacturing Method of Honeycomb Structure:

A manufacturing method of a honeycomb structure of the present invention has a forming step, a slurry coating step, and a firing step. Hereinafter, description will be made as to these steps in order.

(1-1) Forming Step:

In this step, a honeycomb formed body is monolithically formed by using a kneaded material which contains a cordierite forming raw material. Here, "the cordierite forming raw material" is a ceramic raw material to form cordierite by firing, and blended to obtain a chemical composition in which silica falls in a range of 40 to 60 mass %, alumina falls in a range of 15 to 45 mass %, and magnesia falls in a range of 5 to 30 mass %. Specifically, an example of the cordierite forming raw material is a material including a plurality of inorganic raw materials selected from the group consisting of talc, kaolin, calcined kaolin, alumina, aluminum hydroxide, and silica at ratios to obtain the above chemical composition. By use of the kneaded material containing the cordierite forming raw material, it is possible to manufacture a cordierite honeycomb structure having an excellent heat resistance.

It is preferable that the forming kneaded material is prepared by adding a dispersing medium such as water, and a pore former to such a cordierite forming raw material, further adding an organic binder, a dispersing agent or the like as required, and mixing and kneading the materials.

There are not any special restrictions on the pore former as long as the pore former has properties of flying and disappearing when fired in the after-mentioned firing step, and an inorganic substance such as cokes, a polymer compound such as a foamable resin, an organic substance such as starch and the like are suitably usable. One of these materials may be used alone, or any combination of two or more of them may be used.

As the organic binder, hydroxypropyl methylcellulose, methylcellulose, hydroxyethyl cellulose, carboxymethyl cellulose, polyvinyl alcohol and the like are suitably usable. One of these materials may be used alone, or any combination of two or more of them may be used.

As the dispersing agent, ethylene glycol, dextrin, fatty acid soap, polyalcohol and the like are suitably usable. One of these materials may be used alone, or any combination of two or more of them may be used.

There are not any special restrictions on a method of mixing and kneading the cordierite forming raw material and the like to prepare the kneaded material and, for example, a method of mixing and kneading the materials by use of a kneader, a vacuum pugmill or the like is usable.

There are not any special restrictions on a method of monolithically forming the honeycomb formed body, and a heretofore known forming method such as extrusion, injection molding or press molding is usable. Above all, a preferable example of the method is a method of extruding the kneaded material prepared as described above, by use of a die corresponding to a desirable cell shape, a desirable partition wall thickness and a desirable cell density.

Figure 2:
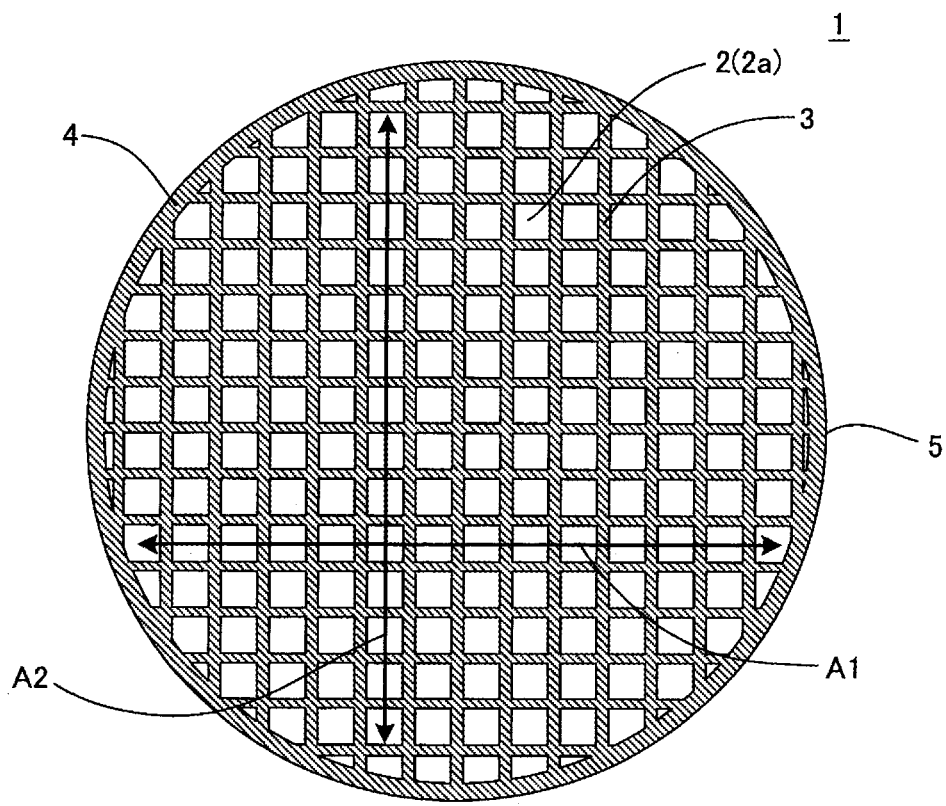
FIG. 2 is a cross-sectional view schematically showing a cross section perpendicular to an extending direction of cells of the honeycomb formed body shown in FIG. 1.

FIG. 1 is a perspective view schematically showing one example of the honeycomb formed body to be formed in this step, and FIG. 2 is a cross-sectional view schematically showing a cross section perpendicular to an extending direction of cells of the honeycomb formed body shown in FIG. 1. As shown in these drawings, a honeycomb formed body 1 formed in this step has partition walls 3 defining a plurality of cells 2 extending from one end face 8 to the other end face 9, and a circumferential wall 4 surrounding the partition walls 3.

Figure 3:
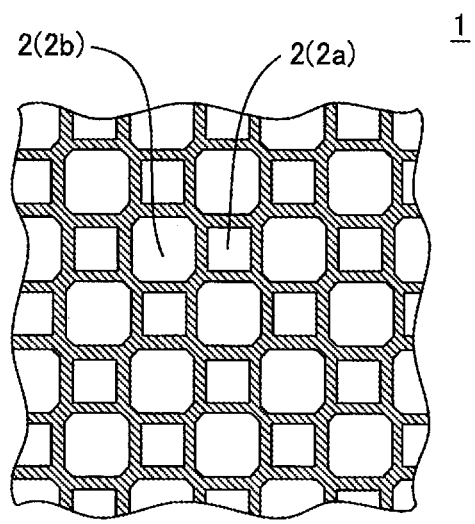
FIG. 3 is a partially cross-sectional view schematically showing a configuration in which quadrangular cells and octagonal cells are alternately arranged in the cross section perpendicular to the extending direction of the cells of the honeycomb formed body.

The plurality of cells 2 are arranged in two mutually orthogonal directions denoted with arrows A1 and A2 in FIG. 2, in the cross section perpendicular to the extending direction of the cells 2. At least parts of the plurality of cells 2 are quadrangular cells 2a possessing a quadrangular shape in the cross section perpendicular to the extending direction of the cells 2. At least 20% of the quadrangular cells 2a are main quadrangular cells arranged in an orientation where diagonal lines of the cells extend in the same direction. Furthermore, it is preferable that at least 40% of the quadrangular cells 2a are the main quadrangular cells, and it is especially preferable that all the quadrangular cells 2a are the main quadrangular cells. There are not any special restrictions on a type of quadrangular shape possessed by the quadrangular cells 2a in the cross section perpendicular to the extending direction of the cells, and the cells may possess any type of shape such as a square shape, a rectangular shape, a rhombic shape, or a parallelogram. In the manufacturing method of the honeycomb structure of the present invention, it is preferable that all the cells 2 of the honeycomb formed body 1 (but excluding cells lacking a part of its shape because the cells are in contact with the circumferential wall) are the quadrangular cells 2a as in the embodiment shown in FIG. 1 and FIG. 2. Furthermore, parts of the plurality of cells 2 may possess a shape other than the quadrangular shape in the cross section perpendicular to the extending direction of the cells 2. For example, as shown in FIG. 3, it is preferable that the plurality of cells 2 of the honeycomb formed body 1 include the quadrangular cells 2a possessing the quadrangular shape and octagonal cells 2b possessing an octagonal shape and the cells are alternately arranged in the cross section perpendicular to the extending direction of the cells 2.

It is preferable that a thickness of the circumferential wall 4 of the honeycomb formed body 1 fired in the after-mentioned firing step is from 0.1 to 4.0 mm. Thus, the thickness of the circumferential wall 4 of the honeycomb formed body 1 is adjusted so that the thickness of the circumferential wall of the honeycomb formed body fired in the firing step is 4.0 mm or less, and hence cracks are not easily generated in the circumferential wall 4 during the firing of the honeycomb formed body 1. However, when the thickness of the circumferential wall 4 of the honeycomb formed body 1 is adjusted so that the thickness of the circumferential wall of the honeycomb formed body fired in the firing step is smaller than 0.1 mm, strength of the circumferential wall occasionally becomes insufficient in the finally obtainable honeycomb structure.

(1-2) Slurry Coating Step:

In this step, after drying the honeycomb formed body 1 formed in the forming step, a coating layer forming slurry which contains the cordierite forming raw material (hereinafter occasionally referred to simply as "the slurry") is coated on specific regions of a circumferential surface 5 that is an outer surface of the circumferential wall 4 of the honeycomb formed body 1.

There are not any special restrictions on a method of drying the honeycomb formed body, and a heretofore known drying method of hot air drying, microwave drying, induction drying, drying under reduced pressure, vacuum drying, freeze drying or the like is usable. Above all, a drying method in which the hot air drying is combined with the microwave drying or the induction drying is preferable in that the whole honeycomb formed body can immediately and uniformly be dried.

It is preferable to prepare the slurry by adding a dispersing medium such as water, and a pore former to the cordierite forming raw material, and further adding an organic binder, a dispersing agent or the like as required.

There are not any special restrictions on the pore former as long as the pore former has properties of flying and disappearing when fired in the after-mentioned firing step, and an inorganic substance such as cokes, a polymer compound such as a foamable resin, an organic substance such as starch and the like are suitably usable. One of these materials may be used alone, or any combination of two or more of them may be used.

As the organic binder, hydroxypropyl methylcellulose, methylcellulose, hydroxyethyl cellulose, carboxymethyl cellulose, polyvinyl alcohol and the like are suitably usable. One of these materials may be used alone, or any combination of two or more of them may be used.

As the dispersing agent, ethylene glycol, dextrin, fatty acid soap, polyalcohol and the like are suitably usable. One of these materials may be used alone, or any combination of two or more of them may be used.

The slurry forms a coating layer through the firing in the after-mentioned firing step. Thus, the slurry forms the coating layer, and then the coating layer has a porosity higher than that of a honeycomb structure main body (the honeycomb formed body fired in the after-mentioned firing step) as much as 5% or more, and preferably has a porosity higher than that of the honeycomb structure main body as much as 5 to 50%. It is to be noted that "the porosity" mentioned herein has a value measured with a mercury porosimeter. The porosity of the coating layer formed by the slurry through the firing is controllable, for example, by adjusting an amount of the pore former included in the slurry. An amount of the pore former to be included in the slurry is preferably from 0.5 to 25 mass % and more preferably from 1.0 to 20 mass % of a mass of the whole slurry. The porosity of the coating layer formed by the slurry through the firing is preferably from 30 to 90% and more preferably from 35 to 85%.

Figure 4:
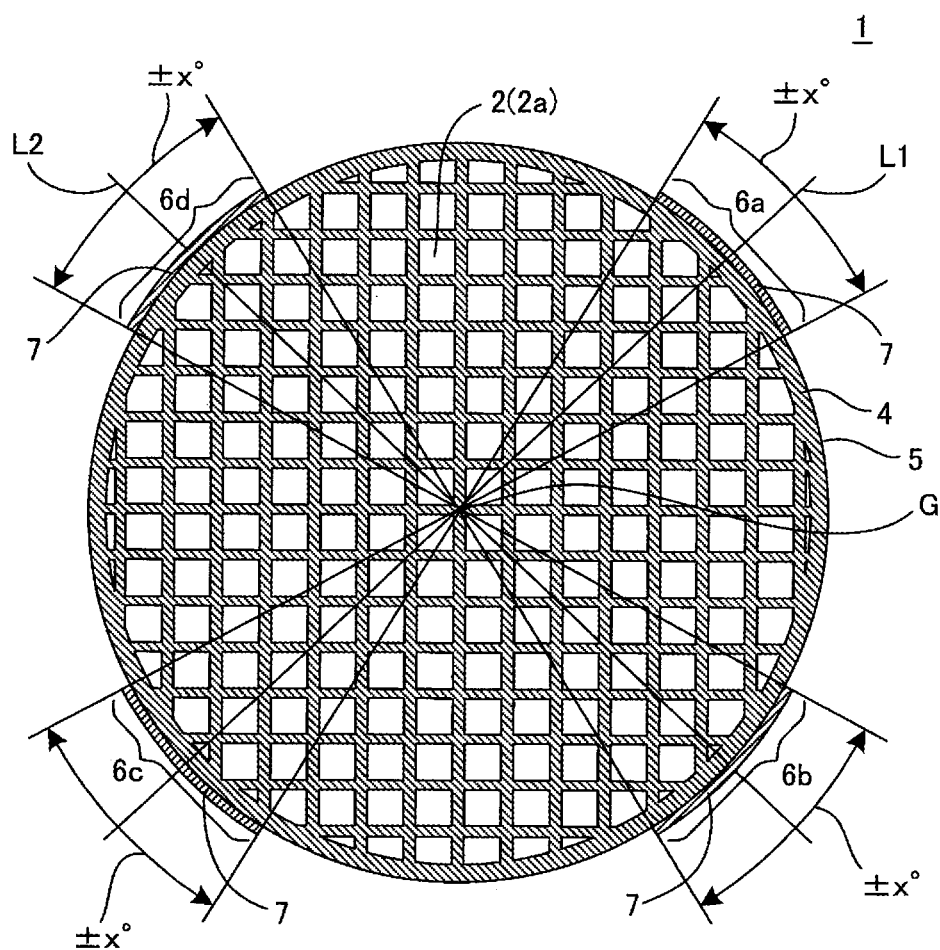
FIG. 4 is an explanatory view showing regions on which a slurry is to be coated in a slurry coating step.

FIG. 4 is an explanatory view showing regions on which the slurry is to be coated. As shown in FIG. 4, in the cross section perpendicular to the extending direction of the cells 2, the regions on which a slurry 7 is to be coated are determined on the basis of two straight lines L1 and L2 passing through the center of gravity G of the cross section and extending in a diagonal direction of the main quadrangular cells 2a. Specifically, the slurry 7 is coated on four regions 6a, 6b, 6c and 6d which are present in a rotation area when each of the two straight lines L1 and L2 is rotated in a range of ±x° of the center of gravity G that is a rotation center, in the circumferential surface 5 that is the outer surface of the circumferential wall 4 of the honeycomb formed body 1. It is to be noted that "the center of gravity G" mentioned herein is the center of gravity of a figure drawn by a circumferential edge of the honeycomb formed body 1 in the cross section perpendicular to the extending direction of the cells 2 of the honeycomb formed body 1.

In the manufacturing method of the honeycomb structure of the present invention, the value x is a value in a range of 7 to 45, preferably in a range of 10 to 45, and further preferably in a range of 15 to 45. When the quadrangular cells 2a possess the square shape in the cross section perpendicular to the extending direction of the cells and when the value x is an upper limit of 45, the four regions 6a, 6b, 6c and 6d are in contact with one another in a circumferential direction of the honeycomb formed body 1. That is, in this case, the whole circumferential surface of the honeycomb formed body 1 is actually the region on which the slurry 7 is to be coated. In the slurry coating step, the slurry 7 may be coated on the whole circumferential surface of the honeycomb formed body 1 in this manner. It is to be noted that when the quadrangular cells 2a possess the quadrangular shape other than the square shape in the cross section perpendicular to the extending direction of the cells, the four regions 6a, 6b, 6c and 6d are occasionally partially superimposed on one another, depending on the value x. In the slurry coating step, a thickness of the slurry 7 to be coated on such a superimposed portion may be the same as a thickness of the slurry 7 to be coated on another portion. In other words, the thickness of the slurry 7 to be coated on the superimposed portion does not have to be twice as much as the thickness of the slurry 7 to be coated on the other portion.

There are not any special restrictions on a method of coating the slurry 7 on the circumferential surface 5 of the honeycomb formed body 1 and, for example, a method of brushing or the like is usable.

As described above, during the firing of the honeycomb formed body 1, cracks are easily generated in regions of the circumferential wall 4 which are intersected by the straight lines L1 and L2 passing through the center of gravity G of the cross section of the honeycomb formed body 1 and extending in the diagonal direction of the quadrangular cells 2a. To eliminate this problem, in the manufacturing method of the honeycomb structure of the present invention, the slurry 7 is coated on the specific regions 6a, 6b, 6c and 6d of the circumferential surface 5 of the honeycomb formed body 1 as described above, to strengthen the regions, thereby preventing the generation of the cracks during the firing of the honeycomb formed body 1.

It is to be noted that when the slurry 7 does not contain the cordierite forming raw material, it is difficult to prevent the generation of the cracks of the circumferential wall 4 during the firing of the honeycomb formed body 1. Furthermore, also when the coating layer formed by the slurry 7 through the firing does not have the porosity higher than that of the honeycomb structure main body as much as 5% or more, it is difficult to prevent the generation of the cracks of the circumferential wall 4 during the firing of the honeycomb formed body 1. Additionally, also when the value x is smaller than 7, it is difficult to prevent the generation of the cracks of the circumferential wall 4 during the firing of the honeycomb formed body 1.

It is preferable that in this slurry coating step, a thickness of the slurry 7 to be coated on the circumferential surface 5 of the honeycomb formed body 1 is adjusted so that a thickness of the coating layer formed by the slurry 7 through the firing in the after-mentioned firing step is from 0.1 to 3.0 mm. Thus, the slurry 7 is coated in such a thickness, and hence it is possible to more effectively prevent the generation of the cracks of the circumferential wall 4 during the firing of the honeycomb formed body 1.

(1-3) Firing Step:

In this step, the honeycomb formed body 1 on which the slurry 7 is coated in the slurry coating step is fired. A firing temperature is preferably from 1350 to 1440° C. Furthermore, a firing time is preferably adjusted so that a keeping time at the highest temperature is from 3 to 10 hours. When the honeycomb formed body is fired on such conditions, the cordierite forming raw materials included in the honeycomb formed body 1 and the slurry 7, respectively, efficiently react, and cordierite is formed from the cordierite forming raw materials.

Figure 5:
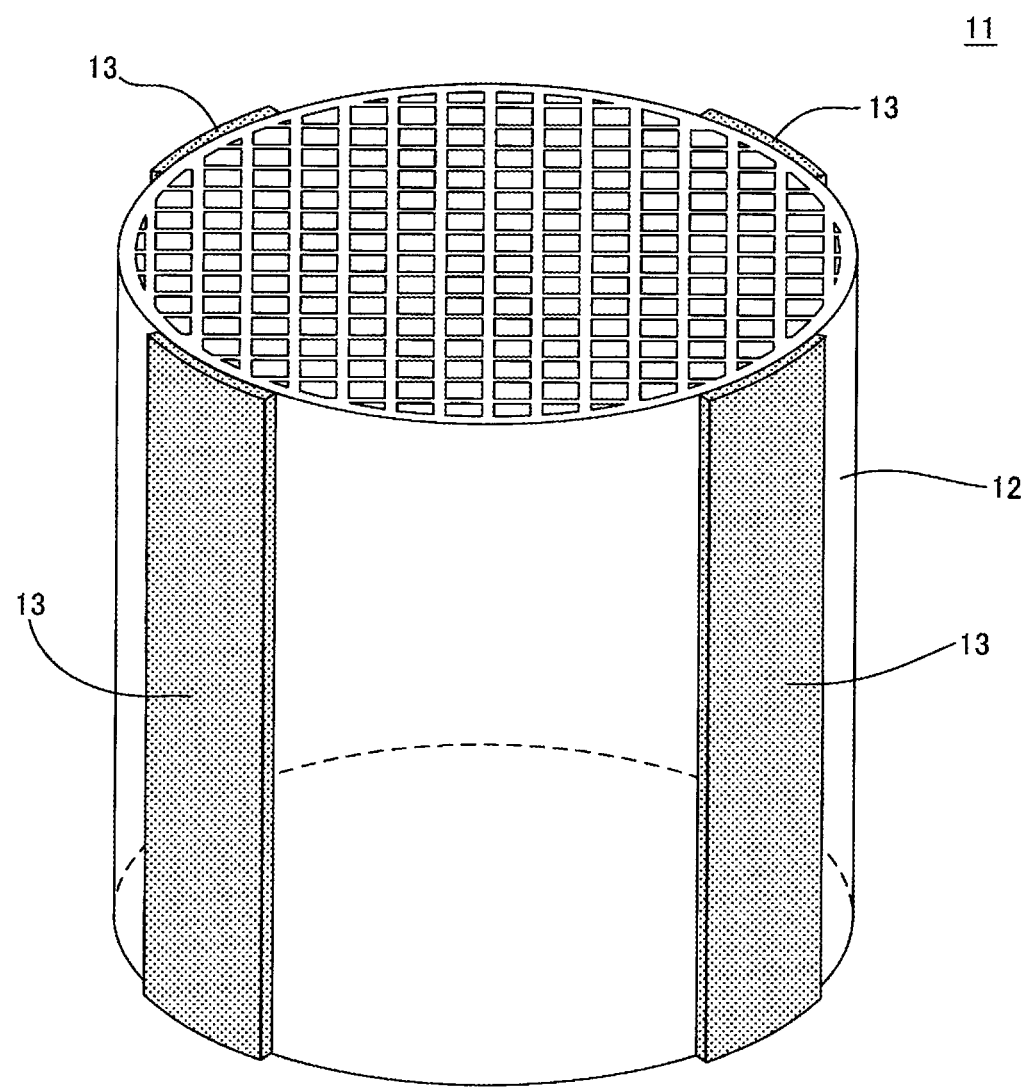
FIG. 5 is a perspective view schematically showing one example of a honeycomb structure manufactured by a manufacturing method of the honeycomb structure of the present invention.

By this firing, as shown in FIG. 5, there is manufactured a honeycomb structure 11 having a honeycomb structure main body 12 deriving from the honeycomb formed body, and a coating layer 13 deriving from the slurry. Here, "deriving from the honeycomb formed body" means that the honeycomb structure main body is formed from the honeycomb formed body (a portion except for slurry of the honeycomb formed body on which the slurry is coated) by the firing. Furthermore, "deriving from the slurry" means that the coating layer is formed from the slurry (a portion except for the honeycomb formed body of the honeycomb formed body on which the slurry is coated) by the firing.

It is to be noted that a convex portion attributed to the coating layer 13 is occasionally generated in the circumferential surface of the honeycomb structure 11 obtained through this firing step. In the case of mounting a catalyst converter in which the honeycomb structure 11 is used in a car or the like, a holding material such as a mat is wound around a circumference of the honeycomb structure 11 onto which a catalyst is loaded, pressure is applied via this holding material to the circumferential surface of the honeycomb structure 11, and in this state, the honeycomb structure is held (calmed) in a tubular can body. When the convex portion is present in the circumferential surface of the honeycomb structure 11, a high pressure is applied to the convex portion during the calming, and the honeycomb structure 11 might be broken. Therefore, the convex portion of the circumferential surface of the fired honeycomb structure 11 may be ground as required.

As described above, in the manufacturing method of the honeycomb structure of the present invention, the slurry including the cordierite forming raw material in the same manner as in the honeycomb formed body and having a porosity after the firing which is higher than a porosity of the honeycomb structure main body as much as 5% or more is coated on the specific regions of the circumferential surface of the honeycomb formed body. Consequently, there are strengthened the specific regions of the circumferential wall of the honeycomb formed body in which the cracks are easily generated during the firing, and it is possible to manufacture the honeycomb structure without generating any cracks in the regions.

Furthermore, it is not necessary to limit an amount of an additive (the organic binder or the like) to be added to the raw material for the purpose of improving formability, and hence the formability is not adversely affected. Additionally, it is not necessary to add the inorganic binder to the raw material, and hence characteristics of the honeycomb structure are not deteriorated or production cost is not raised by the inorganic binder. In addition, even when a heat curve during the firing is not adjusted (prolonged) or the number of the honeycomb formed bodies to be packed in a kiln (a firing furnace) is not decreased, it is possible to prevent the generation of the cracks in the circumferential wall during the firing of the honeycomb formed body.

Additionally, the circumferential wall formed monolithically with the partition walls during the forming of the honeycomb formed body is not removed by grinding or the like or is not formed with a slit in a manufacturing process of the honeycomb structure, but becomes a circumferential wall of a final product as it is, and hence it is possible to manufacture the honeycomb structure in a smaller number of steps. Consequently, according to the manufacturing method of the honeycomb structure of the present invention, a high productivity is obtainable in the manufacturing of the honeycomb structure in which any cracks are not generated in the circumferential wall.

(2) Honeycomb Structure:

A honeycomb structure of the present invention is manufactured by the above-mentioned manufacturing method of the honeycomb structure of the present invention. Therefore, the honeycomb structure of the present invention has characteristics indicating that the honeycomb structure is manufactured by the manufacturing method.

Figure 6:
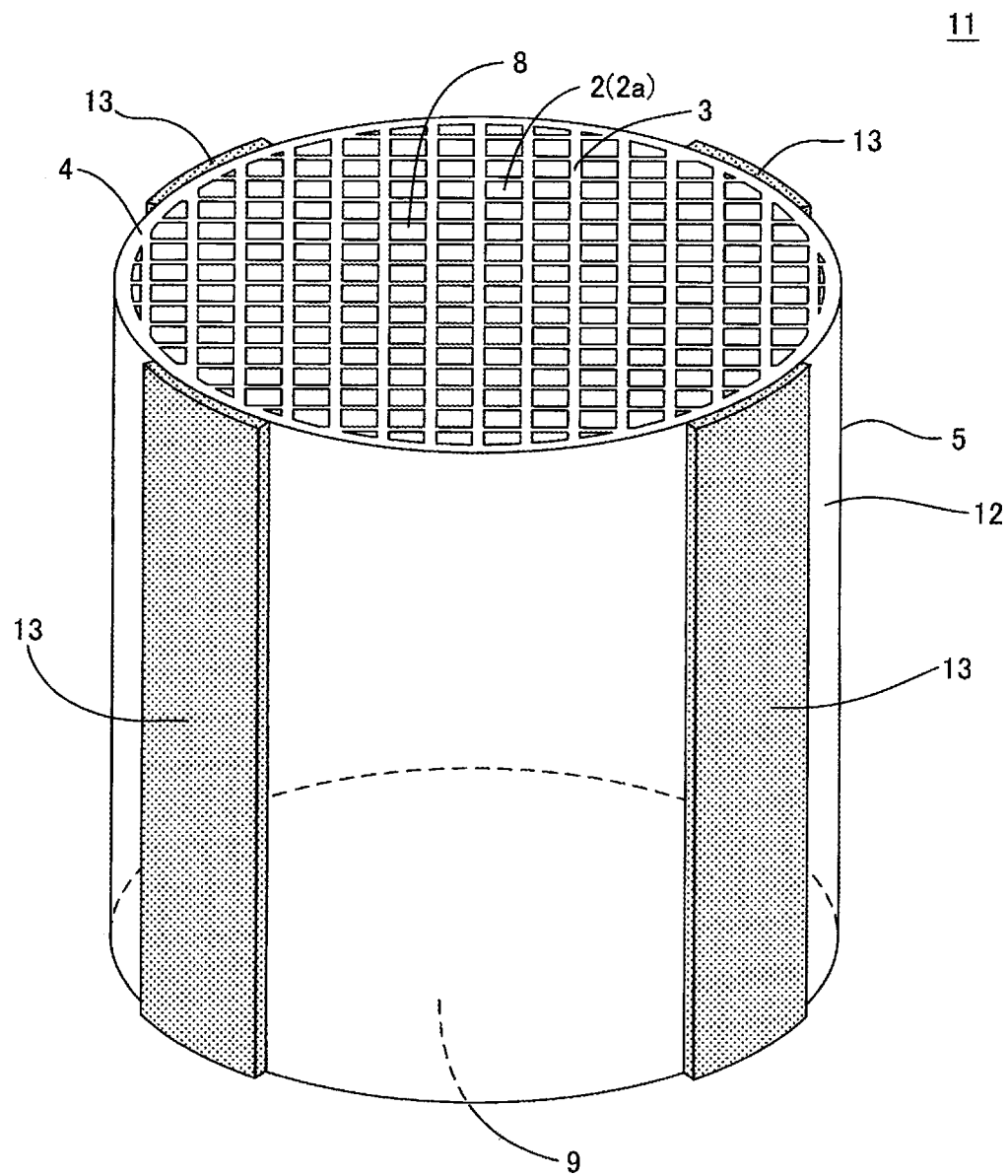
FIG. 6 is a perspective view schematically showing one example of the honeycomb structure of the present invention.
Figure 7:
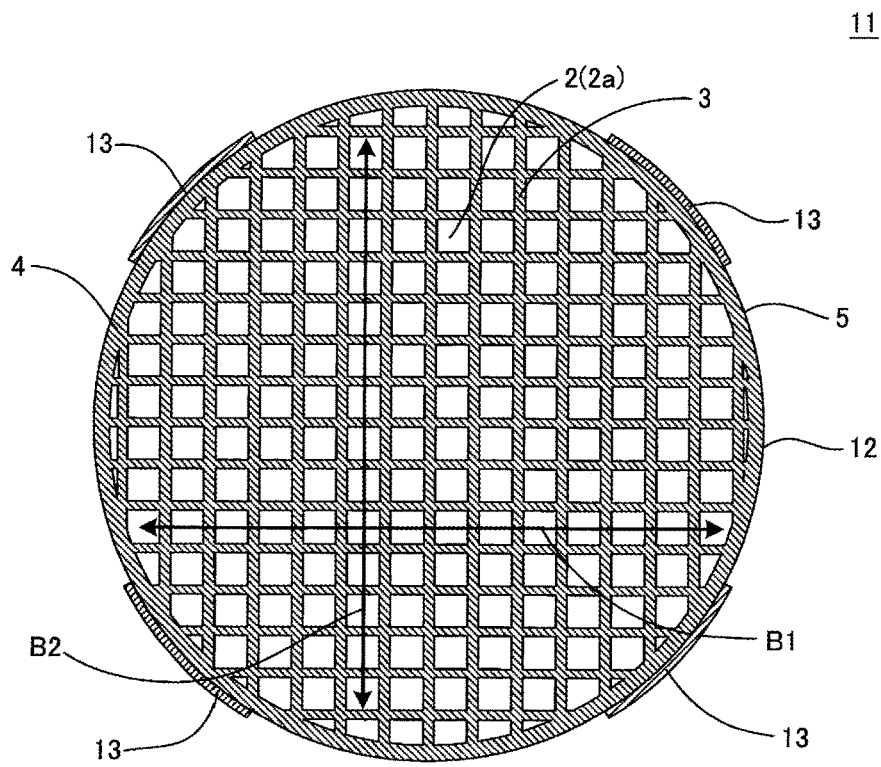
FIG. 7 is a cross-sectional view schematically showing a cross section perpendicular to an extending direction of cells of the honeycomb structure shown in FIG. 6.

FIG. 6 is a perspective view schematically showing one example of the honeycomb structure of the present invention, and FIG. 7 is a cross-sectional view schematically showing a cross section perpendicular to an extending direction of cells of the honeycomb structure shown in FIG. 6. As shown in the drawings, a honeycomb structure 11 of the present invention has a honeycomb structure main body 12 and a coating layer 13.

The honeycomb structure main body 12 has partition walls 3 defining a plurality of cells 2 extending from one end face 8 to the other end face 9, and a circumferential wall 4 surrounding the partition walls 3. The plurality of cells 2 are arranged in two mutually orthogonal directions denoted with arrows B1 and B2 in FIG. 7, in a cross section perpendicular to the extending direction of the cells 2. At least parts of the plurality of cells 2 are quadrangular cells 2a possessing a quadrangular shape in the cross section perpendicular to the extending direction of the cells 2. At least 20% of the quadrangular cells 2a are main quadrangular cells arranged in an orientation where diagonal lines of the cells extend in the same direction. It is to be noted that there are not any special restrictions on a type of quadrangular shape possessed by the quadrangular cells 2a in the cross section perpendicular to the extending direction of the cells, and the cells may possess any type of shape such as a square shape, a rectangular shape, a rhombic shape, or a parallelogram.

Figure 8:
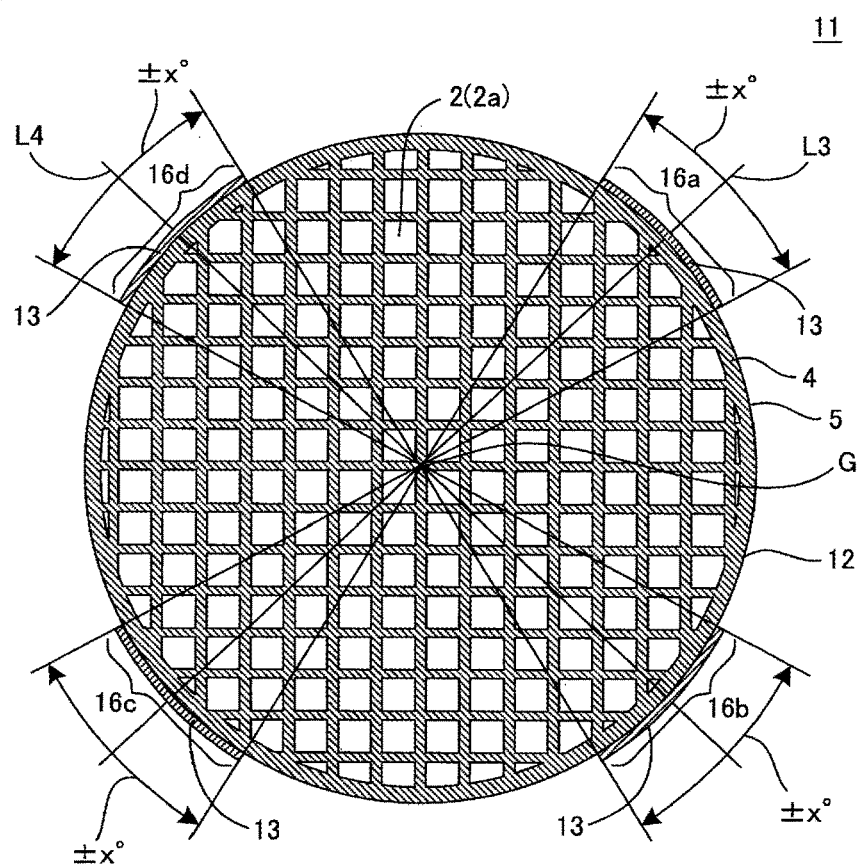
FIG. 8 is an explanatory view showing coating layer-forming regions.

As shown in FIG. 8, the coating layer 13 is formed on a region determined on the basis of two straight lines L3 and L4 passing through the center of gravity G of the cross section and extending in a diagonal direction of the main quadrangular cells 2a in the cross section perpendicular to the extending direction of the cells 2. Specifically, the coating layer 13 is formed on four regions 16a, 16b, 16c, and 16d which are present in a rotation area when each of the two straight lines L3 and L4 is rotated in a range of ±x° of the center of gravity G that is a rotation center in a circumferential surface 5 that is an outer surface of the circumferential wall 4 of the honeycomb structure main body 12. It is to be noted that "the center of gravity G" mentioned herein is the center of gravity of a figure drawn by a circumferential edge of the honeycomb structure main body 12 in the cross section perpendicular to the extending direction of the cells 2 of the honeycomb structure main body 12.

In the honeycomb structure 11 of the present invention, the value x is a value in a range of 7 to 45. When the quadrangular cells 2a possess a square shape in the cross section perpendicular to the extending direction of the cells and when the value x is an upper limit of 45, the four regions 16a, 16b, 16c and 16d are in contact with one another in a circumferential direction of the honeycomb structure main body 12. That is, in this case, the coating layer 13 is actually formed on the whole circumferential surface of the honeycomb structure main body 12. In the honeycomb structure 11 of the present invention, the coating layer 13 may be formed on the whole circumferential surface of the honeycomb structure main body 12 in this manner. It is to be noted that when the quadrangular cells 2a possess the quadrangular shape other than the square shape in the cross section perpendicular to the extending direction of the cells, the four regions 16a, 16b, 16c and 16d are occasionally partially superimposed on one another, depending on the value x. In the honeycomb structure 11 of the present invention, a thickness of the coating layer 13 formed on such a superimposed portion may be the same as a thickness of the coating layer 13 formed on another portion. In other words, the thickness of the coating layer 13 formed on the superimposed portion does not have to be twice as much as the thickness of the coating layer 13 formed on the other portion.

In the honeycomb structure 11 of the present invention, a porosity of the coating layer 13 is higher than a porosity of the honeycomb structure main body 12 as much as 5% or more. It is to be noted that "the porosity" mentioned herein has a value measured with a mercury porosimeter.

The honeycomb structure main body 12 and the coating layer 13 have different porosities as described above, but both of them are made of cordierite.

It is preferable that the honeycomb structure 11 of the present invention is manufactured by employing conditions which are considered to be preferable in the above-mentioned manufacturing method of the honeycomb structure of the present invention, and it is preferable that the honeycomb structure has characteristics generated by employing such conditions.

Figure 9:
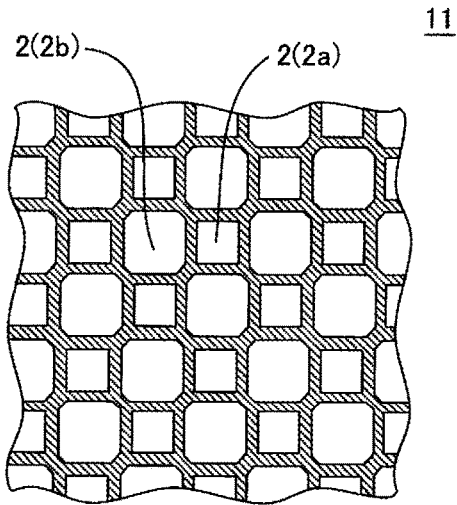
FIG. 9 is a partially cross-sectional view schematically showing a configuration in which quadrangular cells and octagonal cells are alternately arranged in the cross section perpendicular to the extending direction of the cells of the honeycomb structure.

That is, in the honeycomb structure 11 of the present invention, it is preferable that all the cells 2 (but excluding cells lacking a part of its shape because the cells are in contact with the circumferential wall) are the quadrangular cells 2a as in the embodiment shown in FIG. 6 and FIG. 7. Furthermore, parts of the plurality of cells 2 may possess a shape other than the quadrangular shape in the cross section perpendicular to the extending direction of the cells. For example, as shown in FIG. 9, it is preferable that the plurality of cells 2 of the honeycomb structure 11 include the quadrangular cells 2a possessing the quadrangular shape and octagonal cells 2b possessing an octagonal shape and the cells are alternately arranged in the cross section perpendicular to the extending direction of the cells 2. Additionally, it is preferable that at least 40% of the quadrangular cells 2a are main quadrangular cells, and it is especially preferable that all the quadrangular cells 2a are the main quadrangular cells.

Furthermore, in the honeycomb structure 11 of the present invention, the value x is preferably a value in a range of 10 to 45, and further preferably a value in a range of 15 to 45. Additionally, a thickness of the circumferential wall 4 of the honeycomb structure 11 is preferably from 0.1 to 4.0 mm, a porosity of the coating layer 13 is preferably higher than a porosity of the honeycomb structure main body 12 as much as 5.0 to 50%, and a thickness of the coating layer 13 is preferably from 0.1 to 3.0 mm.

The honeycomb structure of the present invention can be manufactured by the manufacturing method of the honeycomb structure of the present invention, and hence in the manufacturing steps, cracks of the circumferential wall are not easily generated, productivity is high, and it is possible to manufacture the honeycomb structure at low production cost.

EXAMPLES

Hereinafter, description will be made as to examples of the present invention in more detail, but the present invention is not limited to such examples.

Example 1

As cordierite forming raw materials, alumina, aluminum hydroxide, kaolin, talc and silica were used. To 100 parts by mass of cordierite forming raw material, 1 mass part of pore former, 32 parts by mass of dispersing medium, 6 parts by mass of organic binder and 1 part by mass of dispersing agent were added, mixed, and kneaded to prepare a kneaded material. As the dispersing medium, water was used, and as the pore former, a foamable resin having an average particle diameter of 40 μm was used. As the organic binder, hydroxypropyl methylcellulose was used, and as the dispersing agent, ethylene glycol was used.

Next, the kneaded material was extruded by using a predetermined die, to form a honeycomb formed body having partition walls defining a plurality of cells extending from one end face to the other end face, and a circumferential wall surrounding the partition walls. In this honeycomb formed body, the whole shape was a round pillar shape, and the plurality of cells was arranged in two mutually orthogonal directions in a cross section perpendicular to an extending direction of the cells. Furthermore, all the cells (but excluding cells lacking a part of its shape because the cells were in contact with the circumferential wall) were quadrangular cells (square cells) possessing a square shape in the cross section perpendicular to the extending direction of the cells. Additionally, all the quadrangular cells were main quadrangular cells arranged in an orientation where diagonal lines of the cells extended in the same direction.

Next, the obtained honeycomb formed body was dried with a microwave drier, and further dried completely with a hot air drier, and then a slurry was coated on specific regions of the honeycomb formed body.

The slurry included a cordierite forming raw material, 5.0 mass % of foamable resin (a copolymer with acrylonitrile having an average particle diameter of 40 μm and a shell wall thickness of 0.2 μm), 35 mass % of water, 2 mass % of organic binder, and 1 mass % of dispersing agent. Additionally, the same cordierite forming raw material, organic binder and dispersing agent as those used in the kneaded material were used.

As shown in FIG. 4, in the cross section perpendicular to the extending direction of the cells 2, regions on which the slurry was to be coated were determined on the basis of two straight lines L1 and L2 passing through the center of gravity G of the cross section and extending in a diagonal direction of main quadrangular cells 2a. Specifically, a slurry 7 was coated on four regions 6a, 6b, 6c and 6d which were present in a rotation area when each of the two straight lines L1 and L2 was rotated in a range of ±x° of the center of gravity G that was a rotation center, in a circumferential surface 5 that was an outer surface of a circumferential wall 4 of a honeycomb formed body 1. The value x in the present example was 7. The slurry 7 was coated in a thickness adjusted so that a thickness of a coating layer formed by the slurry through after-mentioned firing was 0.1 mm.

Next, the honeycomb formed body on which the slurry was coated was fired, to prepare a honeycomb structure having a honeycomb structure main body deriving from the honeycomb formed body, and the coating layer deriving from the slurry. The firing was performed at the highest temperature of 1440° C., for a keeping time of 5 hours at the highest temperature.

In the obtained honeycomb structure, a thickness of partition walls was 4 mil (102 μm), a cell density was 400 cells/square inch (62 cells/cm²), a thickness of a circumferential wall was 0.4 mm, a porosity of the honeycomb structure main body was 32%, and a porosity of the coating layer was 82%. Furthermore, a diameter of the honeycomb structure was 144 mm and a length of the honeycomb structure was 152 mm. A thickness of the coating layer was 0.1 mm.

As to the obtained honeycomb structure, presence/absence of generation of cracks in the circumferential wall and states of the generated cracks were observed and evaluated on criteria below. Table 1 shows the evaluation result.

A: There were not any cracks.

B: The cracks were present in the coating layer, but any cracks were not present in the honeycomb structure main body.

C: The cracks were present in the coating layer and the honeycomb structure main body.

Examples 2 to 4

The procedure of Example 1 was repeated except that a value x was changed to a value shown in Table 1, to prepare honeycomb structures. As to the obtained honeycomb structures, evaluation was performed on criteria similar to those of Example 1. Table 1 shows the evaluation results.

Examples 5 to 8

The procedure of Example 2 was repeated except that a slurry was coated so that a thickness of a coating layer formed by the slurry through firing was a thickness shown in Table 1, to prepare honeycomb structures. As to the obtained honeycomb structures, evaluation was performed on criteria similar to those of Example 1. Table 1 shows the evaluation results.

Examples 9 to 15

The procedure of Example 1 was repeated except that a value x was changed to a value shown in Table 1, a slurry was coated so that a thickness of a coating layer formed by the slurry through firing was a thickness shown in Table 1, and an amount of a foamable resin in the slurry was changed so that a porosity of the coating layer had a value shown in Table 1, to prepare honeycomb structures. As to the obtained honeycomb structures, evaluation was performed on criteria similar to those of Example 1. Table 1 shows the evaluation results.

Comparative Example 1

The procedure of Example 1 was repeated except that a slurry was not coated on a honeycomb formed body, to prepare a honeycomb structure which did not have a coating layer. As to the obtained honeycomb structure, evaluation was performed on criteria similar to those of Example 1. Table 1 shows the evaluation result.

Comparative Example 2

Figure 10:
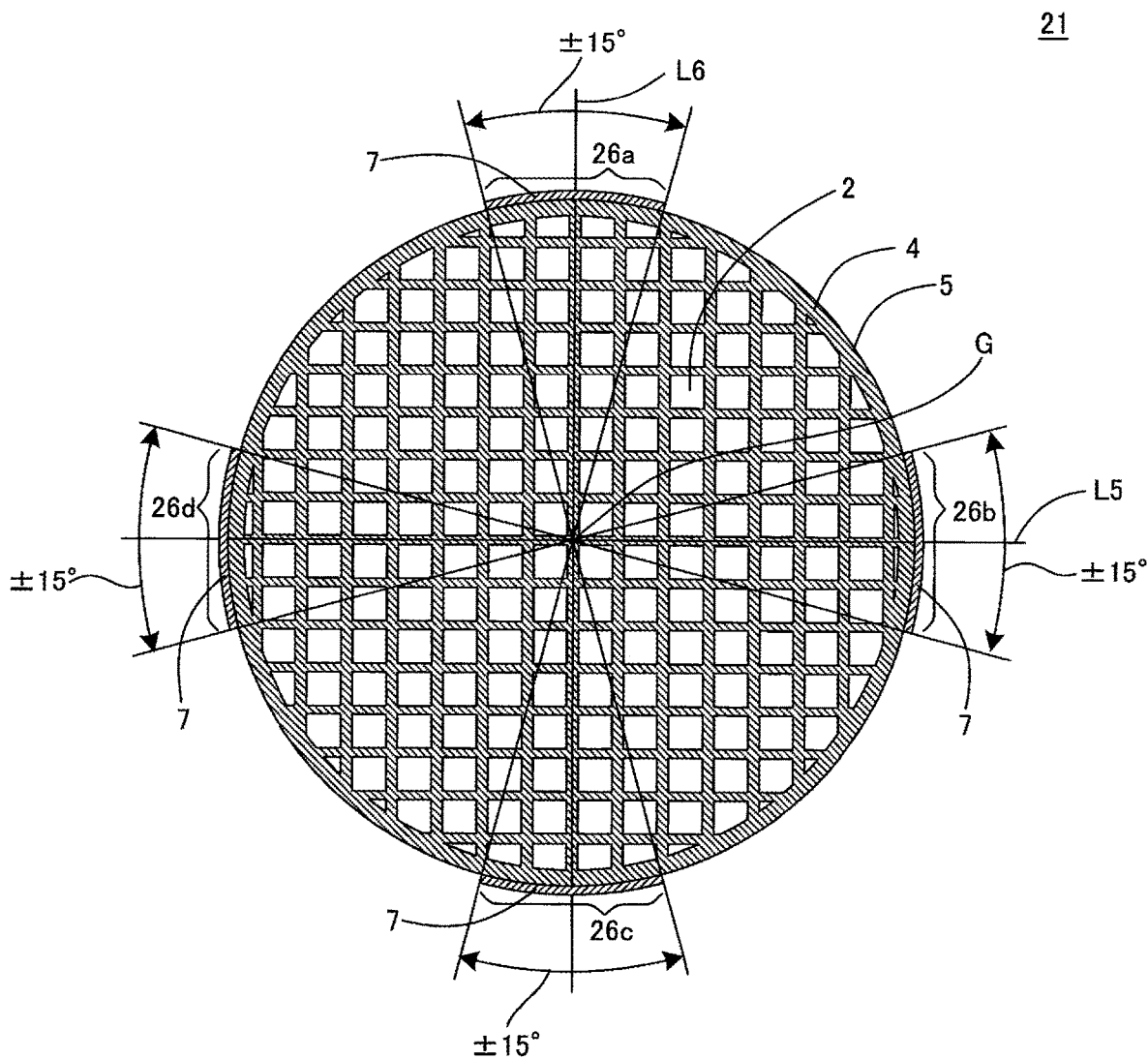
FIG. 10 is an explanatory view showing regions on which a slurry is to be coated in Comparative Example 2.

The procedure of Example 1 was repeated except that regions on which a slurry was to be coated were changed and except that the slurry was coated so that a thickness of a coating layer formed by the slurry through firing was a thickness shown in Table 1, to prepare a honeycomb structure. As shown in FIG. 10, in a cross section perpendicular to an extending direction of cells 2, the regions on which the slurry was to be coated were determined on the basis of two straight lines L5 and L6 passing through the center of gravity G of the cross section and extending in an arrangement direction of the cells 2. Specifically, a slurry 7 was coated on four regions 26a, 26b, 26c, and 26d which were present in a rotation area when each of the two straight lines L5 and L6 was rotated in a range of ±15° of the center of gravity G that was a rotation center, in a circumferential surface 5 that was an outer surface of a circumferential wall 4 of a honeycomb formed body 21. As to the obtained honeycomb structure, evaluation was performed on criteria similar to those of Example 1. Table 1 shows the evaluation result.

Comparative Example 3

The procedure of Example 1 was repeated except that a value x was changed to a value shown in Table 1 and except that a slurry was coated so that a thickness of a coating layer formed by the slurry through firing was a thickness shown in Table 1, to prepare a honeycomb structure. As to the obtained honeycomb structure, evaluation was performed on criteria similar to those of Example 1. Table 1 shows the evaluation result.

Comparative Examples 4 and 5

The procedure of Example 1 was repeated except that a value x was changed to a value shown in Table 1, the number of regions on which a slurry was to be coated was changed to a number shown in Table 1, and the slurry was coated so that a thickness of a coating layer formed by the slurry through firing was a thickness shown in Table 1, to prepare honeycomb structures. As to the obtained honeycomb structures, evaluation was performed on criteria similar to those of Example 1. Table 1 shows the evaluation results.

Comparative Examples 6 to 9

The procedure of Example 1 was repeated except that a value x was changed to a value shown in Table 1, a slurry was coated so that a thickness of a coating layer formed by the slurry through firing was a thickness shown in Table 1, and an amount of a foamable resin in the slurry was changed so that a porosity of the coating layer had a value shown in Table 1, to prepare honeycomb structures. As to the obtained honeycomb structures, evaluation was performed on criteria similar to those of Example 1. Table 1 shows the evaluation results.

Comparative Example 10

The procedure of Example 1 was repeated except that a magnesium acetate solution was used in place of a slurry and except that the magnesium acetate solution was coated so that a thickness of a coating layer formed by the solution through firing was a thickness shown in Table 1, to prepare a honeycomb structure. As to the obtained honeycomb structure, evaluation was performed on criteria similar to those of Example 1. Table 1 shows the evaluation result.

Comparative Example 11

The procedure of Example 1 was repeated except that an alumina sol was used in place of a slurry and except that the alumina sol was coated so that a thickness of a coating layer formed by the sol through firing was a thickness shown in Table 1, to prepare a honeycomb structure. As to the obtained honeycomb structure, evaluation was performed on criteria similar to those of Example 1. Table 1 shows the evaluation result.

Comparative Example 12

The procedure of Example 1 was repeated except that colloidal silica was used in place of a slurry and except that the colloidal silica was coated so that a thickness of a coating layer formed by the colloidal silica through firing was a thickness shown in Table 1, to prepare a honeycomb structure. As to the obtained honeycomb structure, evaluation was performed on criteria similar to those of Example 1. Table 1 shows the evaluation result.

Comparative Example 13

The procedure of Example 1 was repeated except that an epoxy resin was used in place of a slurry and except that the resin was coated so that a thickness of a coating layer formed by the resin through firing was a thickness shown in Table 1, to prepare a honeycomb structure. As to the obtained honeycomb structure, evaluation was performed on criteria similar to those of Example 1. Table 1 shows the evaluation result.

TABLE 1

| | | Coating layer | | Coating range of slurry | | | Thickness | |
| | | | Porosity difference from honeycomb structure | | | | | |
| | Material | Porosity (%) | main body (%) | Extending direction of straight line as basis | x | No. of coated regions | of coated slurry (mm) | Evaluation |
| --- | --- | --- | --- | --- | --- | --- | --- | --- |
| Example 1 | Cordierite | 82 | +50 | Diagonal direction of cells | 7 | 4 | 0.1 | A |
| Example 2 | Cordierite | 82 | +50 | Diagonal direction of cells | 15 | 4 | 0.1 | A |
| Example 3 | Cordierite | 82 | +50 | Diagonal direction of cells | 30 | 4 | 0.1 | A |
| Example 4 | Cordierite | 82 | +50 | Diagonal direction of cells | 45 | 4 | 0.1 | A |
| Example 5 | Cordierite | 82 | +50 | Diagonal direction of cells | 15 | 4 | 0.6 | A |
| Example 6 | Cordierite | 82 | +50 | Diagonal direction of cells | 15 | 4 | 1.8 | A |
| Example 7 | Cordierite | 82 | +50 | Diagonal direction of cells | 15 | 4 | 2.4 | A |
| Example 8 | Cordierite | 82 | +50 | Diagonal direction of cells | 15 | 4 | 3.0 | B |
| Example 9 | Cordierite | 65 | +33 | Diagonal direction of cells | 7 | 4 | 0.2 | A |
| Example 10 | Cordierite | 65 | +33 | Diagonal direction of cells | 45 | 4 | 0.2 | A |
| Example 11 | Cordierite | 50 | +18 | Diagonal direction of cells | 7 | 4 | 0.2 | A |
| Example 12 | Cordierite | 50 | +18 | Diagonal direction of cells | 45 | 4 | 0.2 | A |
| Example 13 | Cordierite | 42 | +10 | Diagonal direction of cells | 7 | 4 | 0.2 | A |
| Example 14 | Cordierite | 37 | +5 | Diagonal direction of cells | 15 | 4 | 0.2 | B |

TABLE 1-continued

| | Coating layer | | | | | | |
|---|---|---|---|---|---|---|---|
| | | Porosity difference from honeycomb structure | | Coating range of slurry | | Thickness | |
| | Material | Porosity (%) | main body (%) | Extending direction of straight line as basis | x | No. of coated regions | of coated slurry (mm) | Evaluation |
| Example 15 | Cordierite | 37 | +5 | Diagonal direction of cells | 45 | 4 | 0.2 | B |
| Comparative Example 1 | — | — | — | — | — | — | — | C |
| Comparative Example 2 | Cordierite | 82 | +50 | Arrangement direction of cells | 15 | 4 | 0.2 | C |
| Comparative Example 3 | Cordierite | 82 | +50 | Diagonal direction of cells | 4 | 4 | 0.2 | C |
| Comparative Example 4 | Cordierite | 82 | +50 | Diagonal direction of cells | 15 | 2 | 0.2 | C |
| Comparative Example 5 | Cordierite | 82 | +50 | Diagonal direction of cells | 15 | 3 | 0.2 | C |
| Comparative Example 6 | Cordierite | 32 | 0 | Diagonal direction of cells | 15 | 4 | 0.2 | C |
| Comparative Example 7 | Cordierite | 32 | 0 | Diagonal direction of cells | 45 | 4 | 0.2 | C |
| Comparative Example 8 | Cordierite | 27 | −5 | Diagonal direction of cells | 15 | 4 | 0.2 | C |
| Comparative Example 9 | Cordierite | 27 | −5 | Diagonal direction of cells | 45 | 4 | 0.2 | C |
| Comparative Example 10 | Magnesium acetate | — | — | Diagonal direction of cells | 15 | 4 | <0.1 | C |
| Comparative Example 11 | Alumina sol | — | — | Diagonal direction of cells | 15 | 4 | <0.1 | C |
| Comparative Example 12 | Colloidal silica | — | — | Diagonal direction of cells | 15 | 4 | <0.1 | C |
| Comparative Example 13 | Epoxy resin | — | — | Diagonal direction of cells | 15 | 4 | <0.1 | C |

*1: Thickness of coating layer formed through firing (Considerations)

As shown in Table 1, Examples 1 to 15 of embodiments of the present invention had evaluation "A" or "B", and any cracks were not generated in a honeycomb structure main body of each example. On the other hand, in Comparative Example 1 in which a slurry was not coated on a honeycomb formed body and Comparative Example 2 in which a slurry was coated on a region different from a region specified in the present invention, evaluation was "C", and cracks were generated in a honeycomb structure main body. Also in Comparative Example 3 in which a value x was smaller than 7, evaluation was "C", and cracks were generated in a honeycomb structure main body. Also in Comparative Examples 4 and 5 in which a slurry was not coated on all four regions specified in the present invention, evaluation was "C", and cracks were generated in a honeycomb structure main body. Also in Comparative Examples 6 to 9 in which a porosity of a coating layer was the same as a porosity of a honeycomb structure main body or lower than the porosity of the honeycomb structure main body, evaluation was "C", and cracks were generated in the honeycomb structure main body. Also in Comparative Examples 10 to 13 in which a magnesium acetate solution, alumina sol, colloidal silica and epoxy resin were coated in place of a slurry, evaluation was "C", and cracks were generated in a honeycomb structure main body.

The present invention is suitably utilizable as a honeycomb structure for use in a catalyst carrier for an exhaust gas purifying catalyst converter, a particulate trapping filter such as a diesel particulate filter or a gasoline particulate filter, or the like, and as a manufacturing method of the honeycomb structure.

DESCRIPTION OF REFERENCE NUMERALS

1: honeycomb formed body, 2: cell, 2a: quadrangular cell, 2b: octagonal cell, 3: partition wall, 4: circumferential wall, 5: circumferential surface, 6a, 6b, 6c and 6d: region on which a slurry is to be coated, 7: slurry, 8: one end face, 9: the other end face, 11: honeycomb structure, 12: honeycomb structure main body, 13: coating layer, 16a, 16b, 16c and 16d: coating layer-forming region, 21: honeycomb formed body, 26a, 26b, 26c and 26d: region on which a slurry is to be coated, A1 and A2: arrow showing an arrangement direction of cells, B1 and B2: arrow showing an arrangement direction of cells, G: center of gravity, L1 and L2: straight line extending in a diagonal direction of quadrangular cells, L3 and L4: straight line extending in a diagonal direction of quadrangular cells, and L5 and L6: straight line extending in an arrangement direction of cells.

What is claimed is:
1. A manufacturing method of a honeycomb structure, comprising:
    a forming step of monolithically forming a honeycomb formed body having partition walls defining a plurality of cells extending from one end face to an other end face, and a circumferential wall surrounding the partition walls, by use of a kneaded material containing a cordierite forming raw material, so that the plurality of cells are arranged in two mutually orthogonal directions in a cross section perpendicular to an extending direction of the plurality of cells, at least parts of the plurality of cells are quadrangular cells possessing a quadrangular shape in the cross section perpendicular to the extending direction of the cells, and at least 20% of the quadrangular cells are main quadrangular cells arranged in an orientation where diagonal lines of the plurality of cells extend in the same direction;

a coating layer forming slurry coating step of drying the honeycomb formed body formed in the forming step, and coating a coating layer forming slurry which contains a cordierite forming raw material on four regions which are present in a rotation area when each of two straight lines passing through the center of gravity of the cross section and extending in a diagonal direction of the main quadrangular cells is rotated in a range of ±x° of the center of gravity that is a rotation center, in the cross section perpendicular to the extending direction of the plurality of cells in a circumferential surface that is an outer surface of the circumferential wall of the honeycomb formed body; and a firing step of firing the honeycomb formed body on which the coating layer forming slurry is coated in the coating layer forming slurry coating step, thereby manufacturing the honeycomb structure having a honeycomb structure main body deriving from the honeycomb formed body, and a coating layer deriving from the coating layer forming slurry, wherein the value x is a value in a range of 7 to 45, and the coating layer forming slurry for use in the coating layer forming slurry coating step is adjusted so that the coating layer formed by the coating layer forming slurry through the firing in the firing step has a porosity which is 5% or more than a porosity of the honeycomb structure main body.

2. The manufacturing method of the honeycomb structure according to claim 1,
wherein a thickness of the coating layer forming slurry to be coated in the coating layer forming slurry coating step is adjusted so that a thickness of the coating layer formed by the coating layer forming slurry through the firing in the firing step is from 0.1 to 3.0 mm.

3. The manufacturing method of the honeycomb structure according to claim 1,
wherein the value x is a value in a range of 10 to 45.

4. The manufacturing method of the honeycomb structure according to claim 1,
wherein the coating layer forming slurry for use in the coating layer forming slurry coating step is adjusted so that the coating layer formed by the coating layer forming slurry through the firing in the firing step has a porosity which is 5 to 50% more than a porosity of the honeycomb structure main body.

5. The manufacturing method of the honeycomb structure according to claim 1,
wherein a thickness of the circumferential wall of the honeycomb formed body fired in the firing step is from 0.1 to 4.0 mm.

6. The manufacturing method of the honeycomb structure according to claim 1,
wherein all of the plurality of cells are quadrangular cells possessing a quadrangular shape in the cross section perpendicular to the extending direction of the plurality of cells.

7. The manufacturing method of the honeycomb structure according to claim 1,
wherein the plurality of cells comprise quadrangular cells possessing a quadrangular shape and octagonal cells possessing an octagonal shape and the quadrangular cells and the octagonal cells are alternately arranged in the cross section perpendicular to the extending direction of the plurality of cells.

* * * * *